(12) United States Patent
Schehrer et al.

(10) Patent No.: US 11,466,758 B2
(45) Date of Patent: Oct. 11, 2022

(54) BELT-DRIVEN CONICAL PULLEY TRANSMISSION FOR A MOTOR VEHICLE

(71) Applicant: Schaeffler Technologies AG & Co. KG, Herzogenaurach (DE)

(72) Inventors: Nicolas Schehrer, Eschau (FR); Markus Baumann, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 249 days.

(21) Appl. No.: 16/768,964

(22) PCT Filed: Nov. 19, 2018

(86) PCT No.: PCT/DE2018/100941
§ 371 (c)(1),
(2) Date: Jun. 2, 2020

(87) PCT Pub. No.: WO2019/110043
PCT Pub. Date: Jun. 13, 2019

(65) Prior Publication Data
US 2021/0033174 A1 Feb. 4, 2021

(30) Foreign Application Priority Data
Dec. 5, 2017 (DE) ..................... 10 2017 128 862.7

(51) Int. Cl.
*F16H 9/18* (2006.01)
*F16H 9/24* (2006.01)
*F16H 7/18* (2006.01)

(52) U.S. Cl.
CPC ................ *F16H 9/18* (2013.01); *F16H 9/24* (2013.01); *F16H 7/18* (2013.01); *F16H 2007/185* (2013.01)

(58) Field of Classification Search
CPC ...... F16H 9/18; F16H 9/24; F16H 7/18; F16H 2007/185
USPC .......................................................... 474/18
See application file for complete search history.

(56) References Cited

FOREIGN PATENT DOCUMENTS

| CN | 106855102 A | * | 6/2017 | .......... F16H 57/0006 |
|---|---|---|---|---|
| DE | 10017005 A1 | * | 10/2000 | ............... F16H 7/18 |
| DE | 10017005 A1 | | 10/2000 | |
| DE | 10203941 A1 | * | 8/2002 | ........... F16H 63/067 |
| DE | 10203941 A1 | | 8/2002 | |
| DE | 102015201882 A1 | | 8/2016 | |
| DE | 102016216280 A1 | | 3/2017 | |

(Continued)

*Primary Examiner* — Gene O Crawford
*Assistant Examiner* — Emily Rose Kincaid

(57) ABSTRACT

A belt-driven conical pulley transmission includes a first pulley sheave pair arranged on the first shaft, a second pulley sheave pair arranged on the second shaft, a belt means, a first slide rail, and a second slide rail. Each pulley sheave pair includes a first conical pully displaceable along a respective shaft axis and a second conical pulley fixed along the respective axis. The belt means is displaceable in a radial direction along respective contact faces of the pulley sheave pairs from an inner position to an outer position. The belt means includes a traction strand extending through an intermediate space between the first pulley sheave pair and the second pulley sheave pair, and a thrust strand extending through the intermediate space. The first slide rail is guides the traction strand and the second slide rail is designed different from the first slide rail and guides the thrust strand.

15 Claims, 5 Drawing Sheets

(56) References Cited

FOREIGN PATENT DOCUMENTS

| EP | 2372189 A1 | 10/2011 | |
|---|---|---|---|
| JP | 2002250419 A | 9/2002 | |
| WO | WO-2009132636 A1 * | 11/2009 | ............... F16H 9/24 |
| WO | 2014012741 A1 | 1/2014 | |
| WO | 2016127983 A1 | 8/2016 | |
| WO | WO-2016127983 A1 * | 8/2016 | ............... F16H 7/18 |

* cited by examiner

BELT-DRIVEN CONICAL PULLEY TRANSMISSION FOR A MOTOR VEHICLE

CROSS-REFERENCE TO RELATED APPLICATIONS

This application is the United States National Phase of PCT Appln. No. PCT/DE2018/100941 filed Nov. 19, 2018, which claims priority to German Application No. DE102017128862.7 filed Dec. 5, 2017, the entire disclosures of which are incorporated by reference herein.

TECHNICAL FIELD

The disclosure concerns a belt-driven conical pulley transmission for a motor vehicle. The belt-driven conical pulley transmission includes at least a first pulley sheave pair arranged on a first shaft and a second pulley sheave pair arranged on a second shaft, and a belt means for transmitting a torque between the pulley sheave pairs.

The belt-driven conical pulley transmission is in particular a CVT drive (continuously variable transmission), preferably for a motor vehicle. The belt-driven conical pulley transmission may be used in conjunction with an internal combustion engine or another drive unit for driving a motor vehicle.

Such a belt-driven conical pulley transmission normally includes at least a first pulley sheave pair and a second pulley sheave pair, each with a first conical pulley which can be displaced along the shaft axis and a second conical pulley which is fixed in the direction of the shaft axis, and a belt means which is provided for transmitting a torque between the pulley sheave pairs.

BACKGROUND

Such belt-driven conical pulley transmissions have been known for a long time. In operation of the belt-driven conical pulley transmission, the belt means is displaced on the pulley sheave pairs in a radial direction between an inner position and an outer position.

Belt-driven conical pulley transmissions are being designed ever more compactly, wherein the space between the shafts and hence between the pulley sheave pairs is reduced ever further. The space available for the slide rails between the pulley sheave pairs is also being reduced. The slide rails are arranged both on the traction strand and on the thrust strand of the belt means, and serve to guide the belt means. The slide rails are designed for acoustically efficient chain guidance (belt means guidance). The length of guidance of the belt means and the stiffness of the slide rails are decisive influence factors. Previously, slide rails were constructed identically for the traction strand and the thrust strand.

The reduction in installation space means that at least the guide length of the slide rails must be reduced.

SUMMARY

Example aspects broadly comprise a belt-driven conical pulley transmission with a first pulley sheave pair arranged on a first shaft having a first shaft axis, and a second pulley sheave pair arranged on a second shaft having a second shaft axis. Each pulley sheave pair includes a first conical pulley which can be displaced along the shaft axis and a second conical pulley which is fixed in the direction of the shaft axis. Furthermore, a belt means (e.g. a chain) is provided for transmitting a torque between the pulley sheave pairs. The belt means can be displaced in a radial direction on each pulley sheave pair between an inner position and an outer position along a contact face of the conical pulleys. A traction strand (here in particular, tensile strains act on the belt means in the rotation direction of the belt means) and a thrust strand (here in particular, thrust strains act on the belt means in the rotation direction of the belt means) of the belt means extend through an intermediate space between the first pulley sheave pair and the second pulley sheave pair. The traction strand is guided by a first slide rail arranged in the intermediate space, and the thrust strand is guided by a second slide rail arranged in the intermediate space. The first slide rail and the second slide rail are designed differently from each other (e.g. with a different geometric design or with different material used).

It is proposed that each slide rail is designed to be structurally adapted to the installation space available. Thus for each slide rail, the necessary guide lengths and stiffnesses may be ensured structurally or be designed as long and great as possible.

In an example embodiment, the belt means has an inside pointing towards the shafts and an outside of opposite orientation. The first slide rail has a first outer belt means guide arranged on the outside and the second slide rail has a second outer belt means guide arranged on the outside. The first outer belt means guide and the second outer belt means guide are configured differently from each other.

In an example embodiment, in a first plane running transversely to the shaft axes (and in particular along a geometric center of the outer belt means guide), the outer belt means guides each have an outer contour pointing away from the shafts. A first outer contour of the first outer belt means guide and a second outer contour of the second outer belt means guide are configured differently from each other.

The outer belt means guides have outer contours which are adapted to the arrangement of further components of the motor vehicle. This may adversely affect a necessary stiffness of the outer belt means guide but also of the slide rail as a whole. It is proposed that, where applicable, only the one of the outer belt means guides is adapted to a component present there.

In an example embodiment, the belt means has an inside pointing towards the shafts and an outside of opposite orientation. The first slide rail has a first inner belt means guide arranged on the inside and the second slide rail has a second inner belt means guide arranged on the inside. The first inner belt means guide and the second inner belt means guide are configured differently from each other.

In an example embodiment, in a first plane running transversely to the shaft axes, the inner belt means guides each have an inner contour pointing towards the shafts. A first inner contour of the first inner belt means guide and a second inner contour of the second inner belt means guide are configured differently from each other.

The inner belt means guides also have inner contours which are adapted to the arrangement of further components of the motor vehicle. This may adversely affect a necessary stiffness of the inner belt means guide but also of the slide rail as a whole. It is proposed that, where applicable, only the one of the inner belt means guides is adapted to a component present there.

In an example embodiment, in a second plane containing the shaft axes, the intermediate space has a first free cross-sectional area for the arrangement of the first slide rail in each setting of the conical pulleys which is possible in operation of the belt-driven conical pulley transmission, and a second free cross-sectional area for the arrangement of the second slide rail in each setting of the conical pulleys which is possible in operation of the belt-driven conical pulley transmission. At least the first slide rail fills the first cross-sectional area to at least 70%, in particular at least 80%, preferably at least 90%, or the second slide rail fills the second cross-sectional area to at least 70%, in particular at least 80%, preferably at least 90%.

In an example embodiment, the second plane extends along the extension direction of the belt means through the respective slide rail and hence parallel to the shaft axes. The second plane may change its position depending on the setting of the conical pulleys and the resulting position of the slide rails.

The possible settings of the conical pulleys may comprise the arrangement of the four conical pulleys relative to each other, starting from an inner position of the belt means on one pulley sheave pair and up to an outer position of the belt means on the pulley sheave pair, and the associated positions of the belt means on the other pulley sheave pair.

The respective cross-sectional area in the second plane and in the intermediate space results from the physical limitations predefined by the pulley sheave pairs and the shafts. A width of the respective cross-sectional area (in the direction of the shaft axes) may be predefined by the maximum spacing of the contact faces of the fixed second pulley sheaves.

Furthermore, a motor vehicle is proposed with a belt-driven conical pulley transmission as described above.

The statements relating to the belt-driven conical pulley transmission apply accordingly to the motor vehicle, and vice versa.

By way of precaution, it is noted that the numerical words used here ("first", "second" etc.) serve primarily (only) to distinguish several similar objects, sizes or processes, i.e. in particular do not necessarily predefine a mutual dependency and/or order of these objects, sizes or processes. If a dependency and/or order is necessary, this is explicitly specified or arises evidently for the person skilled in the art when studying the actual embodiment described.

BRIEF DESCRIPTION OF THE DRAWINGS

The disclosure and the technical environment are explained in more detail below with reference to the figures. It is pointed out that the disclosure should not be restricted by the exemplary embodiments presented. In particular, unless explicitly specified otherwise, it is also possible to extract partial aspects of the situations explained in the figures and combine these with other constituents and knowledge from the present description and/or figures. In particular, it is pointed out that the figures and in particular the size ratios depicted therein are purely diagrammatic. The same reference signs designate identical objects, so that explanations from other figures may be consulted in addition. In the drawings.

DETAILED DESCRIPTION

Figure 1:
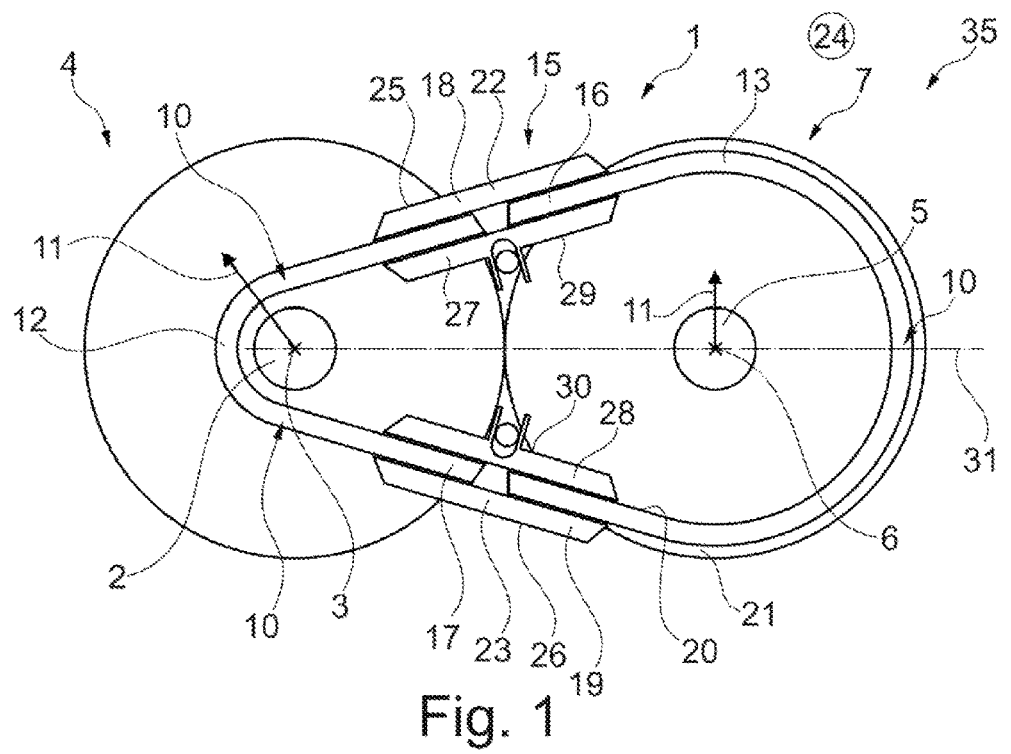
FIG. 1 shows a side view of a motor vehicle with a first belt-driven conical pulley transmission.
Figure 2:
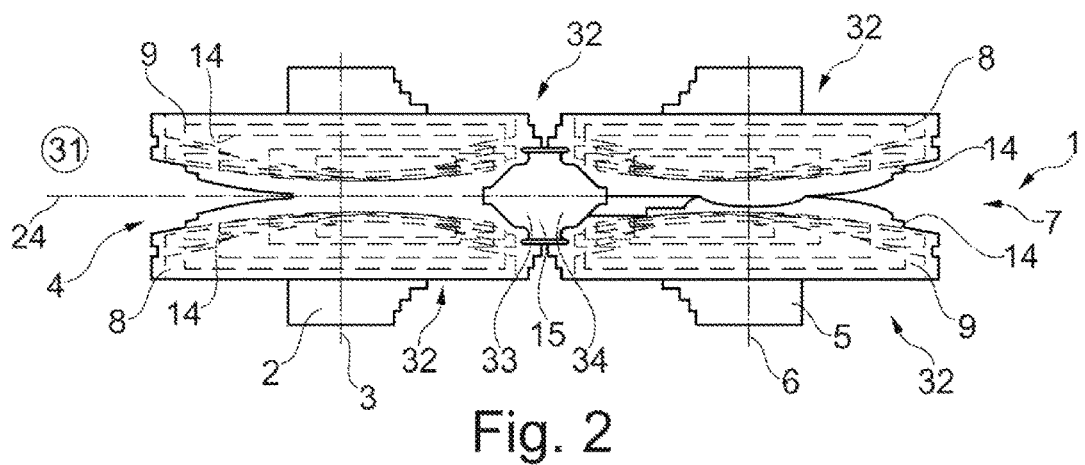
FIG. 2 shows a view from above of a belt-driven conical pulley transmission illustrating the possible settings of the pulley sheave pairs with identical slide rails fitted for the traction strand and thrust strand.
Figure 3:
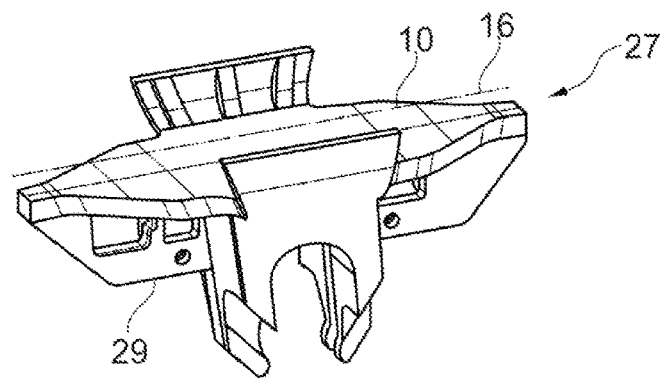
FIG. 3 shows a perspective view of an inner belt means guide designed according to FIG. 2.

FIG. 1 shows a side view of a motor vehicle 35 with a first belt-driven conical pulley transmission 1. FIG. 2 shows a top view of a belt-driven conical pulley transmission 1, illustrating the possible settings 32 of the pulley sheave pairs 4, 7, with identical slide rails 18, 19 fitted for the traction strand 16 and thrust strand 17. FIG. 3 shows a perspective view of a first inner belt means guide 27 designed according to FIG. 2. FIGS. 1 to 3 are described jointly below.

The belt-driven conical pulley transmission 1 has a first pulley sheave pair 4 arranged on a first shaft 2 having a first shaft axis 3, and a second pulley sheave pair 7 arranged on a second shaft 5 having a second shaft axis 6. Each pulley sheave pair 4, 7 has a first conical pulley 8 which can be displaced along the respective shaft axis 3, 6, and a second conical pulley 9 which is fixed in the direction of the shaft axis 3, 6. Furthermore, a belt means 10 (e.g. a chain) is provided for transmitting a torque between the pulley sheave pairs 4, 7, wherein the belt means 10 can be displaced in a radial direction 11 on each pulley sheave pair 4, 7 between an inner position 12 and an outer position 13 along a contact face 14 of the conical pulleys 8, 9. A traction strand 16 and a thrust strand 17 of the belt means 10 extend through an intermediate space 15 between the first pulley sheave pair 4 and the second pulley sheave pair 7. The traction strand 16 is guided via a first slide rail 18 arranged in the intermediate space 15, and the thrust strand 17 is guided by a second slide rail 19 arranged in the intermediate space 15. The first slide rail 18 and second slide rail 19 are structurally identical.

The belt means 10 has an inside 20 pointing towards the shafts 2, 5, and an outside 21 of opposite orientation. The first slide rail 18 has a first outer belt means guide 22 arranged on the outside 21, and the second slide rail 19 has a second outer belt means guide 23 arranged on the outside 21.

In a first plane 24 which runs transversely to the shaft axes 3, 6 and along a geometric center of the outer belt means guide 22, 23, the outer belt means guides 22, 23, each have an outer contour 25, 26 pointing away from the shafts 2, 5.

Furthermore, the first slide rail 18 has a first inner belt means guide 27 arranged on the inside 20, and the second slide rail 19 has a second inner belt means guide 28 arranged on the inside 20.

In a first plane 24 which runs transversely to the shaft axes 3, 6 and along a geometric center of the outer belt means guide 22, 23, the inner belt means guides 27, 28, each have an inner contour 29, 30 pointing towards the shafts 2, 5.

Since the slide rails 18, 19 fitted are structurally identical, then as shown in FIG. 2, all possible settings 32 of the conical pulleys 8, 9 must be considered. The installation space then available in the intermediate space 15 for arrangement of the slide rails 18, 19 is here represented by the first cross-sectional area 33 and the second cross-sectional area 34.

Figure 4:
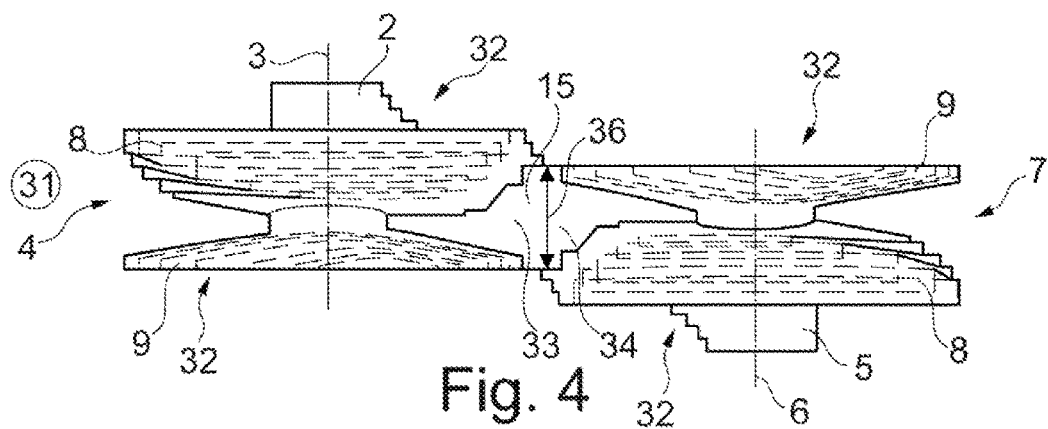
FIG. 4 shows a view from above of a belt-driven conical pulley transmission illustrating the possible settings of the pulley sheave pairs with different slide rails fitted for the traction strand and thrust strand.
Figure 5:
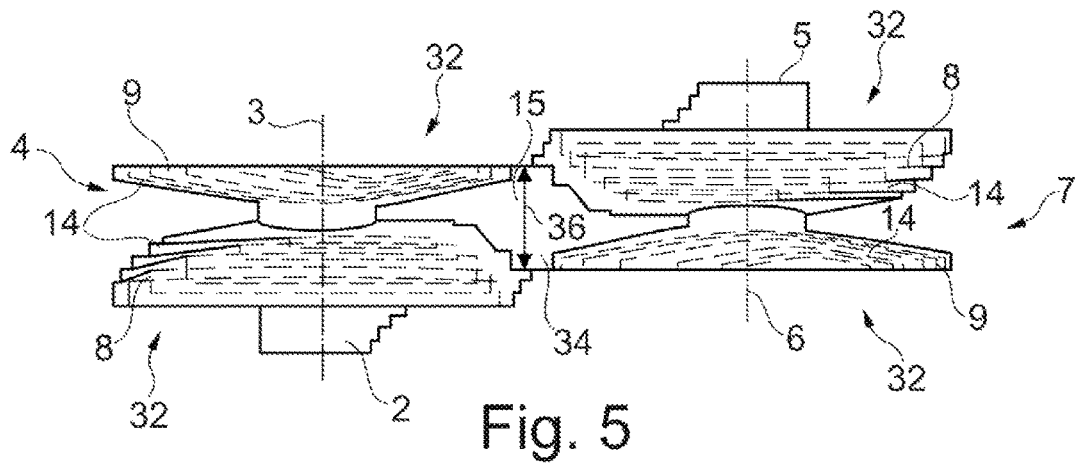
FIG. 5 shows a view from below of the belt-driven conical pulley transmission from FIG. 4 illustrating the possible settings of the pulley sheave pairs with different slide rails fitted for the traction strand and thrust strand.
Figure 6:
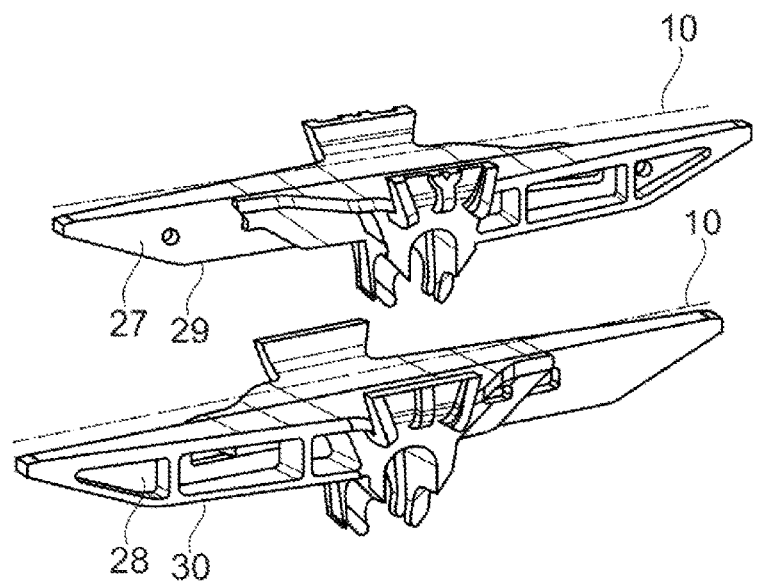
FIG. 6 shows a perspective view of first and second inner belt means guides designed according to FIGS. 4 and 5.

FIG. 4 shows a top view of a belt-driven conical pulley transmission 1, illustrating the possible settings 32 of the pulley sheave pairs 4, 7 with different slide rails 18, 19 fitted for the traction strand 16 and thrust strand 17. FIG. 5 shows a view from below of the belt-driven conical pulley transmission 1 according to FIG. 4, illustrating the possible settings 32 of the pulley sheave pairs 4, 7 with different slide rails 18, 19 fitted for the traction strand 16 and thrust strand 17. FIG. 6 shows a perspective view of first and second inner belt means guides 27, 28 designed according to FIGS. 4 and 5. FIGS. 4 to 6 are described jointly below. Reference is made to the statements concerning FIGS. 1 to 3.

In contrast to FIGS. 1 to 3, here mutually differing slide rails 18, 19 are used. Taking this fact into account, the installation space available in the intermediate space 15 for arrangement of the side rails 18, 19 is then determined by the possible settings 32 of the conical pulleys 8, 9. The fixed second pulley sheaves 9 are thereby established and defined.

In a second plane 31 containing the shaft axes 3, 6, the intermediate space 15 comprises a first free cross-sectional area 33 for arrangement of the first slide rails 18 in each setting 32 of the conical pulleys 8, 9 which is possible in operation of the belt-driven conical pulley transmission 1, and a second free cross-sectional area 34 for arrangement of the second slide rail 19 in each setting 32 of the conical pulleys 8, 9 which is possible in operation of the belt-driven conical pulley transmission 1. The slide rails 18, 19 are configured so as to fill a majority of the available cross-sectional area 33, 34. The different sizes of the slide rails 18, 19 are evident from the inner belt means guides 27, 28 according to FIGS. 3 and 6.

The respective cross-sectional area 33, 34 in the second plane 31 and in the intermediate space 15 arises from the physical limitations predefined by the pulley sheave pairs 4, 7 and the shafts 2, 5. A width of the respective cross-sectional area 33, 34 (in the direction of the shaft axes 3, 6) is predefined by the greatest spacing 36 of the contact faces 14 of the fixed second pulley sheaves 9.

Figure 7:
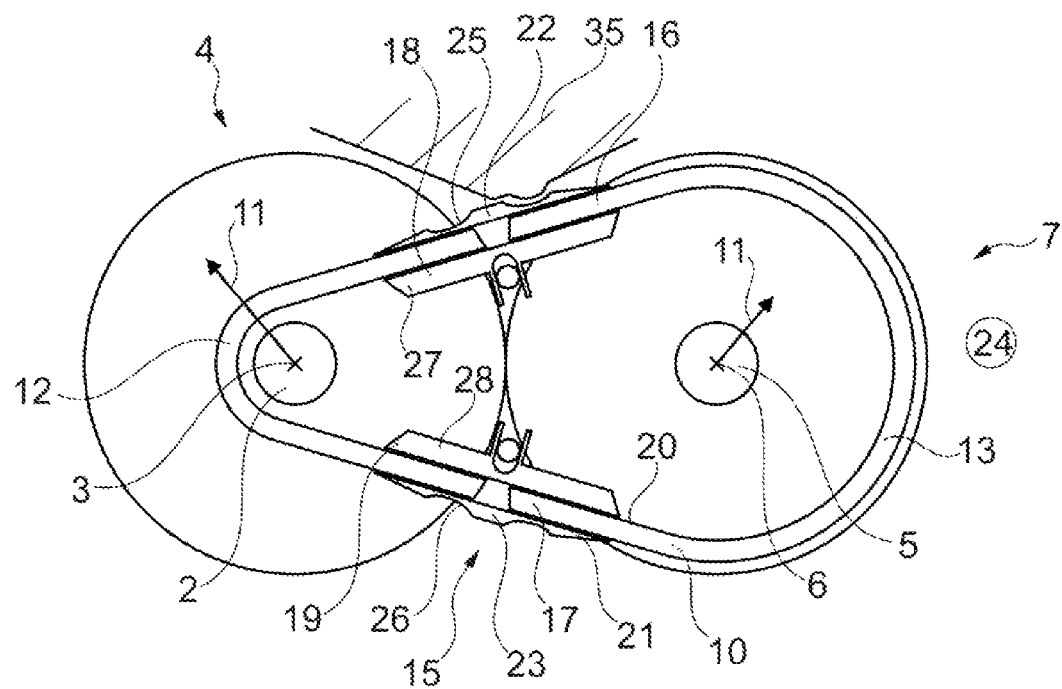
FIG. 7 shows a side view of a second belt-driven conical pulley transmission.
Figure 8:
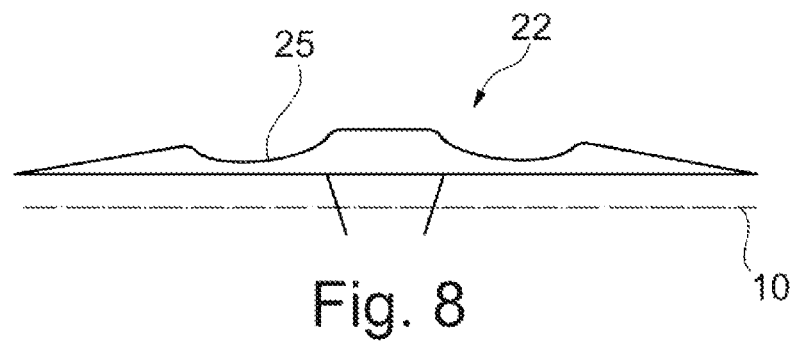
FIG. 8 shows a side view of an outer belt means guide designed according to FIG. 7.

FIG. 7 shows a side view of a second belt-driven conical pulley transmission 1. FIG. 8 shows a side view of a first outer belt means guide 22 designed according to FIG. 7. FIGS. 7 and 8 are described jointly below. Reference is made to the statements in relation to FIGS. 1 to 3.

In a first plane 24 running transversely to the shaft axes 3, 6, the outer belt means guides 22, 23 each have an outer contour 25, 26 pointing away from the shafts 2, 5. A first outer contour 25 of the first outer belt means guide 22, and a second outer contour 26 of the second outer belt means guide 23, are here structurally identical.

The first outer belt means guide 22 has an outer contour 25 which is adapted to the arrangement of further components of the motor vehicle 35. Since, previously, always structurally identical slide rails or belt means guides 22 were used, this restriction of installation space would also be implemented for the second outer belt means guide 23.

Figure 9:
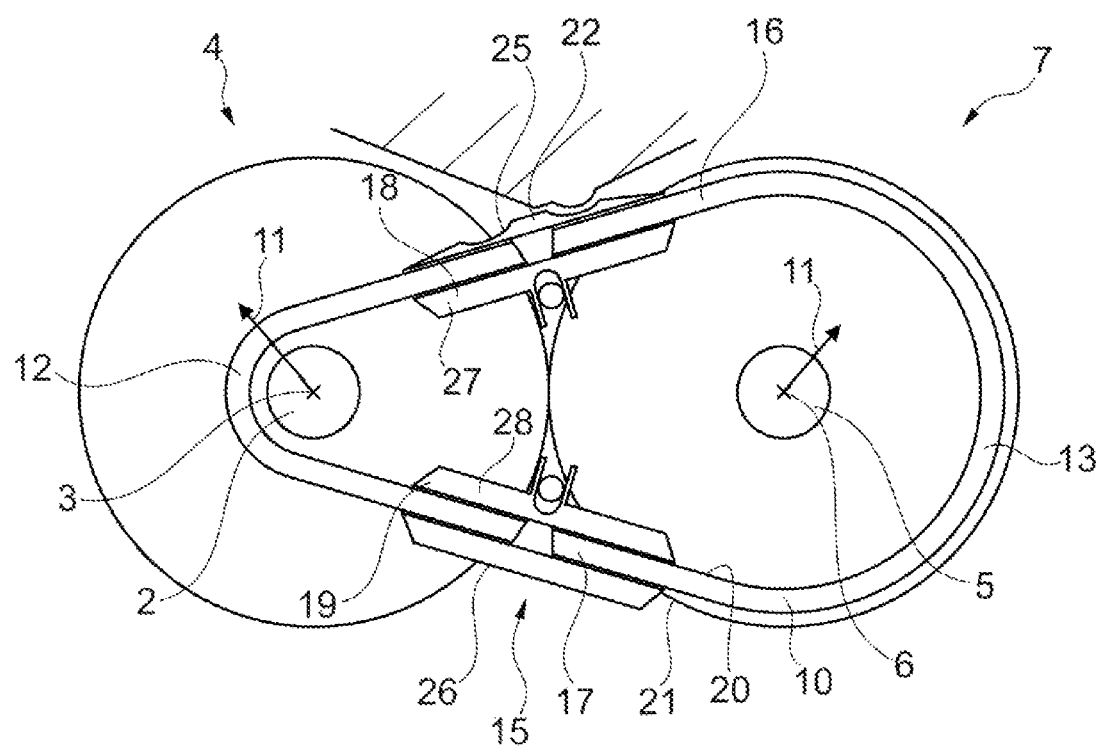
FIG. 9 shows a side view of a third belt-driven conical pulley transmission.
Figure 10:
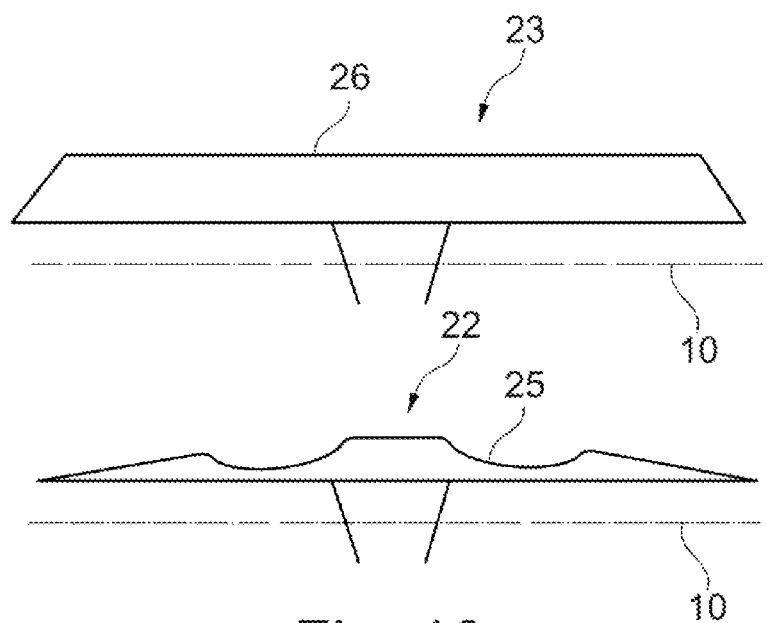
FIG. 10 shows a side view of first and second inner belt means guides designed according to FIG. 9.
Figure 11:
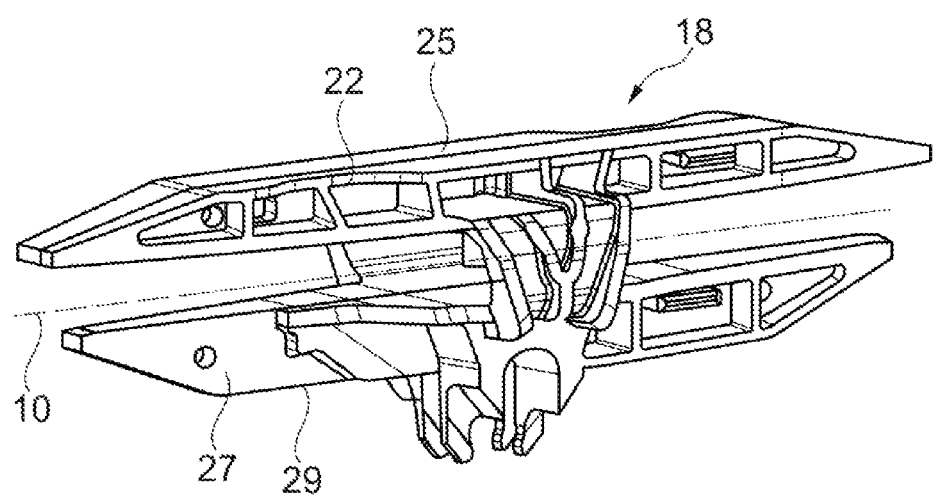
FIG. 11 shows a slide rail in a perspective depiction.

FIG. 9 shows a side view of a third belt-driven conical pulley transmission 1. FIG. 10 shows a side view of first and second outer belt means guides 22, 23 designed according to FIG. 9. FIGS. 9 and 10 are described jointly below. Reference is made to the statements relating to FIGS. 7 and 8.

In contrast to FIGS. 7 and 8, here mutually differing outer belt means guides 22, 23 are fitted. The first outer belt means guide 22 takes into account the arrangement of the components of the motor vehicle 35. The second outer belt means guide 23 at the second contour 26 does not have this adaptation of the first contour 25.

FIG. 10 shows a first slide rail 18 in a perspective view. Because of the design of the slide rail 18 which is dependent on installation site, this can now be configured with maximum possible length of guidance for the belt means 10 and maximum possible stiffness.

REFERENCE NUMERALS

1 Belt-driven conical pulley transmission
2 First shaft
3 First shaft axis
4 First pulley sheave pair
5 Second shaft
6 Second shaft axis
7 Second pulley sheave pair
8 First conical pulley
9 Second conical pulley
10 Belt means
11 Radial direction
12 Inner position
13 Outer position
14 Contact face
15 Intermediate space
16 Traction strand
17 Thrust strand
18 First slide rail
19 Second slide rail
20 Inside
21 Outside
22 First outer belt means guide
23 Second outer belt means guide
24 First plane
25 First outer contour
26 Second outer contour
27 First inner belt means guide
28 Second inner belt means guide
29 First inner contour
30 Second inner contour
31 Second plane
32 Setting
33 First cross-sectional area
34 Second cross-sectional area
35 Motor vehicle
36 Spacing

The invention claimed is:

1. A belt-driven conical pulley transmission comprising:
a first shaft comprising a first shaft axis;
a first pulley sheave pair, arranged on the first shaft, comprising:
  a first conical pully displaceable along the first shaft axis; and
  a second conical pulley fixed along the first shaft axis;
a second shaft comprising a second shaft axis;
a second pulley sheave pair, arranged on the second shaft, comprising:
  a third conical pulley displaceable along the second shaft axis; and
  a fourth conical pulley fixed along the second shaft axis;
an intermediate space between the first pulley sheave pair and the second pulley sheave pair a belt means for transmitting a torque between the first pulley sheave pair and the second pulley sheave pair, displaceable in a radial direction along respective contact faces of each pulley of the first pulley sheave pair and the second pulley sheave pair from a respective inner position to a respective an outer position, and comprising:
  a traction strand extending through the intermediate space; and
  a thrust strand extending through the intermediate space;
a first slide rail arranged to guide the traction strand in the intermediate space; and
a second slide rail, having a different geometric design than the first slide rail or formed from a different material than the first slide rail, arranged to guide the thrust strand in the intermediate space.

2. The belt-driven conical pulley transmission of claim 1, wherein:
  the belt means comprises:
    an inside pointing towards the first shaft and the second shaft; and
    an outside of opposite orientation;
  the first slide rail comprises a first outer belt means guide arranged on the outside; and
  the second slide rail comprises a second outer belt means guide, having a different geometric design than the first outer belt means guide, arranged on the outside.

3. The belt-driven conical pulley transmission of claim 2, further comprising:
  a first plane running transversely to the first shaft axis and the second shaft axis, wherein:
    the first outer belt means guide comprises a first outer contour in the first plane; and
    the second outer belt means guide comprises a second outer contour in the first plane, different than the first outer contour.

4. The belt-driven conical pulley transmission of claim 3, wherein:
  the belt means comprises:
    an inside pointing towards the first shaft and the second shaft; and
    an outside of opposite orientation;
  the first slide rail comprises a first inner belt means guide arranged on the inside; and
  the second slide rail comprises a second inner belt means guide, having a different geometric design than the first inner belt means guide, arranged on the inside.

5. The belt-driven conical pulley transmission of claim 4, further comprising:
  a first plane running transversely to the first shaft axis and the second shaft axis, wherein:
    the first inner belt means guide comprises a first inner contour in the first plane; and
    the second inner belt means guide comprises a second inner contour in the first plane, different than the first inner contour.

6. The belt-driven conical pulley transmission of claim 5 wherein:
  the first shaft axis and the second shaft axis are disposed on a second plane;
  the intermediate space comprises:
    a first free cross-sectional area between the first pulley sheave pair and the second pulley sheave pair in the second plane for arrangement of the first slide rail in each setting of the conical pulleys which is possible during operation of the belt-driven conical pulley transmission; and
    a second free cross-sectional area between the first pulley sheave pair and the second pulley sheave pair in the second plane for arrangement of the second slide rail in each setting of the conical pulleys which is possible in operation of the belt-driven conical pulley transmission; and
  the first slide rail fills at least 70% of the first free cross-sectional area or the second slide rail fills at least 70% of the second free cross-sectional area.

7. The belt-driven conical pulley transmission of claim 1, wherein:
  the belt means comprises:
    an inside pointing towards the first shaft and the second shaft; and
    an outside of opposite orientation;
  the first slide rail comprises a first inner belt means guide arranged on the inside; and
  the second slide rail comprises a second inner belt means guide, having a different geometric design than the first inner belt means guide, arranged on the inside.

8. The belt-driven conical pulley transmission of claim 7, further comprising:
  a first plane running transversely to the first shaft axis and the second shaft axis, wherein:
    the first inner belt means guide comprises a first inner contour in the first plane; and
    the second inner belt means guide comprises a second inner contour in the first plane, different than the first inner contour.

9. The belt-driven conical pulley transmission of claim 8 wherein:
  the first shaft axis and the second shaft axis are disposed on a second plane;
  the intermediate space comprises:
    a first free cross-sectional area between the first pulley sheave pair and the second pulley sheave pair in the second plane for arrangement of the first slide rail in each setting of the conical pulleys which is possible during operation of the belt-driven conical pulley transmission; and
    a second free cross-sectional area between the first pulley sheave pair and the second pulley sheave pair in the second plane for arrangement of the second slide rail in each setting of the conical pulleys which is possible in operation of the belt-driven conical pulley transmission; and
  the first slide rail fills at least 70% of the first free cross-sectional area or the second slide rail fills at least 70% of the second free cross-sectional area.

10. The belt-driven conical pulley transmission of claim 1 wherein:
  the first shaft axis and the second shaft axis are disposed on a second plane;
  the intermediate space comprises:
    a first free cross-sectional area between the first pulley sheave pair and the second pulley sheave pair in the second plane for arrangement of the first slide rail in each setting of the conical pulleys which is possible during operation of the belt-driven conical pulley transmission; and
    a second free cross-sectional area between the first pulley sheave pair and the second pulley sheave pair in the second plane for arrangement of the second slide rail in each setting of the conical pulleys which is possible in operation of the belt-driven conical pulley transmission; and the first slide rail fills at least 70% of the first free cross-sectional area or the second slide rail fills at least 70% of the second free cross-sectional area.

11. A motor vehicle comprising the belt-driven conical pulley transmission of claim 1.

12. A belt-driven conical pulley transmission comprising:
a first shaft comprising a first shaft axis;
a first pulley sheave pair, arranged on the first shaft, comprising:
  a first conical pully displaceable along the first shaft axis; and
  a second conical pulley fixed along the first shaft axis;
a second shaft comprising a second shaft axis;
a second pulley sheave pair, arranged on the second shaft, comprising:
  a third conical pulley displaceable along the second shaft axis; and
  a fourth conical pulley fixed along the second shaft axis;
an intermediate space between the first pulley sheave pair and the second pulley sheave pair
a belt means for transmitting a torque between the first pulley sheave pair and the second pulley sheave pair, displaceable in a radial direction along respective contact faces of each pulley of the first pulley sheave pair and the second pulley sheave pair from a respective inner position to a respective an outer position, and comprising:
  a traction strand extending through the intermediate space; and
  a thrust strand extending through the intermediate space;
a first slide rail arranged to guide the traction strand in the intermediate space;
a second slide rail, designed different from the first slide rail, arranged to guide the thrust strand in the intermediate space; and
a first plane running transversely to the first shaft axis and the second shaft axis, wherein:
  the belt means comprises:
    an inside pointing towards the first shaft and the second shaft; and
    an outside of opposite orientation;
  the first slide rail comprises a first outer belt means guide arranged on the outside;
  the second slide rail comprises a second outer belt means guide, configured different from the first outer belt means guide, arranged on the outside;
  the first outer belt means guide comprises a first outer contour in the first plane; and
  the second outer belt means guide comprises a second outer contour in the first plane, configured differently from the first outer contour.

13. The belt-driven conical pulley transmission of claim 12, wherein:
the belt means comprises:
the first slide rail comprises a first inner belt means guide arranged on the inside; and
the second slide rail comprises a second inner belt means guide, configured different from the first inner belt means guide, arranged on the inside.

14. A belt-driven conical pulley transmission comprising:
a first shaft comprising a first shaft axis;
a first pulley sheave pair, arranged on the first shaft, comprising:
  a first conical pully displaceable along the first shaft axis; and
  a second conical pulley fixed along the first shaft axis;
a second shaft comprising a second shaft axis;
a second pulley sheave pair, arranged on the second shaft, comprising:
  a third conical pulley displaceable along the second shaft axis; and
  a fourth conical pulley fixed along the second shaft axis;
an intermediate space between the first pulley sheave pair and the second pulley sheave pair
a belt means for transmitting a torque between the first pulley sheave pair and the second pulley sheave pair, displaceable in a radial direction along respective contact faces of each pulley of the first pulley sheave pair and the second pulley sheave pair from a respective inner position to a respective an outer position, and comprising:
  a traction strand extending through the intermediate space; and
  a thrust strand extending through the intermediate space;
a first slide rail arranged to guide the traction strand in the intermediate space;
a second slide rail, designed different from the first slide rail, arranged to guide the thrust strand in the intermediate space; and
a first plane running transversely to the first shaft axis and the second shaft axis, wherein:
  the belt means comprises:
    an inside pointing towards the first shaft and the second shaft; and
    an outside of opposite orientation;
  the first slide rail comprises a first inner belt means guide arranged on the inside;
  the second slide rail comprises a second inner belt means guide, configured different from the first inner belt means guide, arranged on the inside;
  the first inner belt means guide comprises a first inner contour in the first plane; and
  the second inner belt means guide comprises a second inner contour in the first plane, configured differently from the first inner contour.

15. The belt-driven conical pulley transmission of claim 14, further comprising:
a first plane running transversely to the first shaft axis and the second shaft axis, wherein:
  the first inner belt means guide comprises a first inner contour in the first plane; and
  the second inner belt means guide comprises a second inner contour in the first plane, configured differently from the first inner contour.

* * * * *